US011293766B2

(12) United States Patent
Epperlein et al.

(10) Patent No.: US 11,293,766 B2
(45) Date of Patent: *Apr. 5, 2022

(54) COGNITIVE JOURNEY COMPANION SYSTEM

(71) Applicant: INTERNATIONAL BUSINESS MACHINES CORPORATION, Armonk, NY (US)

(72) Inventors: Jonathan Epperlein, Dublin (IE); Claudio Gambella, Dublin (IE); Wynita M. Griggs, Maynooth (IE); Yassine Lassoued, Dublin (IE); Jakub Marecek, Dublin (IE); Martin Mevissen, Dublin (IE); Julien Monteil, Dublin (IE); Rodrigo H. Ordonez-Hurtado, Maynooth (IE); Giovanni Russo, Dublin (IE); Robert Shorten, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,809

(22) Filed: Oct. 23, 2019

(65) Prior Publication Data
US 2020/0056898 A1 Feb. 20, 2020

Related U.S. Application Data

(63) Continuation of application No. 15/469,808, filed on Mar. 27, 2017, now Pat. No. 10,527,437.

(51) Int. Cl.
G01C 21/34 (2006.01)
G01C 21/00 (2006.01)
(Continued)

(52) U.S. Cl.
CPC ....... *G01C 21/3415* (2013.01); *G01C 21/005* (2013.01); *G01C 21/20* (2013.01); *G01C 21/3461* (2013.01); *G06Q 40/08* (2013.01)

(58) Field of Classification Search
CPC ............ G01C 21/3415; G01C 21/3461; G01C 21/005; G01C 21/20; G06Q 40/08
See application file for complete search history.

(56) References Cited

U.S. PATENT DOCUMENTS 8,022,831 B1 * 9/2011 Wood-Eyre ............... B60T 7/14
340/575
8,732,101 B1 * 5/2014 Wilson ................ G06F 16/9535
706/15

(Continued)

FOREIGN PATENT DOCUMENTS

AU 8732101 A * 2/2002 ........... B05B 7/2437
AU 20100015579 A * 2/2002 ............... G09F 3/00

(Continued)

OTHER PUBLICATIONS

E. Husni, G. B. Hertantyo, D. W. Wicaksono, F. C. Hasibuan, A. U. Rahayu and M. A. Triawan, "Applied Internet of Things (IoT): Car monitoring system using IBM BlueMix," 2016 International Seminar on Intelligent Technology and Its Applications (ISITIA), Lombok, 2016, pp. 417-422 (Year: 2016).*

*Primary Examiner* — Thomas G Black
*Assistant Examiner* — Ana D Thomas
(74) *Attorney, Agent, or Firm* — Griffiths & Seaton PLLC

(57) ABSTRACT

A system and method for cognitive journey monitoring are presented. Embodiments comprise journey prediction, parsing of data sources, risk assessment and mitigation, and natural-language user interaction by a cognitive processor. Data is gathered from a plurality of data sources and analyzed in the context of one or more of the user's intention(s). A dialogue with the user, in natural language, (Continued)

aims to provide and select one or more suggestions relating to the one or more user intention(s) such that the risk(s) relating to the one or more user's intention(s) is reduced. During the dialogue, cognitive reasoning may be performed, wherein the cognitive reasoning includes the ability to justify each suggestion and the ability to infer information from the interaction such as, for example, data obtained in a dialogue may inform subsequent inferences. The embodiments may use speech synthesis and speech recognition in an interactive spoken dialogue.

20 Claims, 9 Drawing Sheets

(51) Int. Cl.
*G01C 21/20* (2006.01)
*G06Q 40/08* (2012.01)

(56) References Cited

U.S. PATENT DOCUMENTS

| | | | |
|---|---|---|---|
| 9,092,309 B2* | 7/2015 | MacNeille | G06Q 30/0265 |
| 2001/0047261 A1* | 11/2001 | Kassan | G10L 15/30 |
| | | | 704/270 |
| 2010/0015579 A1* | 1/2010 | Schlabach | G06N 5/04 |
| | | | 434/11 |
| 2013/0054106 A1* | 2/2013 | Schmudderich | G06K 9/00805 |
| | | | 701/96 |

FOREIGN PATENT DOCUMENTS

| | | | | |
|---|---|---|---|---|
| IT | 8022831 | * | 6/1980 | |
| KR | 20010047261 A | * | 6/2001 | |
| KR | 8732101 A | * | 2/2010 | G02B 1/041 |
| KR | 20100015579 A | * | 2/2010 | G02B 1/041 |
| KR | 20130054106 A | * | 5/2013 | |
| WO | 2015006516 A2 | | 1/2015 | |

* cited by examiner

COGNITIVE JOURNEY COMPANION SYSTEM

CROSS REFERENCE TO RELATED APPLICATIONS

This Application is a Continuation of U.S. patent application Ser. No. 15/469,808, filed on Mar. 27, 2017.

BACKGROUND OF THE INVENTION

Field of the Invention

The present invention relates in general to computing systems, and more particularly to, various embodiments for cognitive risk mitigation for a journey by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency and safety such as, for example, for using the vast amount of available data to recognize and mitigate risks in the time-critical context of an ongoing journey. A need exists for providing a user with a system that learns consumer behavior, preference, and priorities while mitigating and reducing risks associated with a journey.

SUMMARY OF THE INVENTION

Various embodiments for a risk-aware cognitive journey companion system having one or more processors, are provided. In one embodiment, by way of example only, a method for monitoring of a journey, again by a processor, is provided. One or more solutions provide for journey prediction, parsing of data sources, risk assessment and mitigation, and natural-language user interaction by a cognitive processor. One or more solutions may include gathering data from a plurality of data sources and analyzed in the context of one or more of the user's intention(s). A dialogue with the user, in natural language, provides and selects one or more suggestions relating to the one or more user intention(s) such that the risk(s) relating to the one or more user's intention(s) is reduced. During the dialogue, cognitive reasoning may be performed, wherein the cognitive reasoning includes the ability to justify each suggestion and the ability to infer information from the interaction, i.e. data obtained in the dialogue may inform subsequent inferences. The embodiments may use speech synthesis and speech recognition in an interactive spoken dialogue.

One or more solutions are provided for a risk-aware cognitive journey companion system. One or more solutions provide for analyzing data gathered from a plurality of data sources relating to one or more journeys. One or more solutions provide cognitive reasoning and interacting with a user, via a cognitive component such that the reasoning and interacting include at least assisting with inferring an intention of the user relating to the journey, providing one or more suggestions relating to a risk of the journey; and selecting the one or more suggestions. The risk-aware cognitive journey companion system provides an advantage by providing suggestions to mitigate the various types of risks associated with a journey. Another advantage provided by the embodiments enable reasoning with a user by the risk-aware cognitive journey companion system interacting with the user using audible communications via the interactive voice dialog component.

Each risk and a cause of the risk associated with the journey may be determined for one or more user's intention(s). The risks may include various events having a negative impact upon safety, convenience, a duration of travel, level of enjoyment of the user or a vehicle associated with the user, or a combination thereof. The events may include at least historical data relating to a user or vehicle, user behavior, one or more selected priorities of the user, actions of the user, calendar information associated with the user, information provided by one or more sensor devices or tags, biological data, biometric information surveyed from an occupant of a vehicle, physiological data, feedback information, social media information, weather, traffic conditions, environmental conditions, alerts, route conditions, events, accidents, news information, emergency data information, data obtained in real time from sensor based devices associated with the vehicle, detected vehicular faults or failures, devices or components of a vehicle being in an on position or off position, data relating to the vehicle, a plurality of vehicle factors, manufacturing information of the vehicle, a current position of the user or the vehicle, or a combination thereof.

As another added feature and advantage over the current state of the art, each risk may be defined for the one or more journeys based on a cognitive analysis of data gathered from the plurality of data sources. One or more solutions determine a presence or absence of the risk for the one or more journeys and determining the one or more suggestions according to the analyzed data to reduce the risk determined for the one or more journeys. A parsing engine, included within and/or associated with the risk-aware cognitive journey companion system, may parse the data gathered from the plurality of data sources. For example, in one aspect, the variety of data sources may be analyzed by a natural language processing ("NLP") operation (e.g., text analysis) to data mine the relevant information from the content of the data sources in order to compute a risk measure associated with a current journey. Also, the various data sources may include at least a user profile, sensor based devices associated with the user or vehicle, wearable sensors, camera devices, data sources relating to or Internet of Things (IoT) computing networks, governmental entities, commercial entities, or combination thereof.

As another added feature and advantage over the current state of the art, the risk-aware cognitive journey companion interacts and reasons with the user if and only if potential risk(s) with one or more of the predicted journeys is detected. As a result, on a regular journey, without risks, the system will not interact with the user at all, hence it will not add to the distractions already present.

As another added feature and advantage over the current state of the art, the risk-aware cognitive journey companion system provides, during the cognitive reasoning, one or more reasons and suggestions to reduce the risk determined for each of the one or more journeys (and/or parking, driving time, user/vehicle behavior, speed advice, and the like), instructions for traveling the one or more journeys selected by the user based on the one or more reasons and suggestions, justification for supporting the one or more reasons and suggestions for reducing risks associated with the one or more journeys, and/or responding, during the cognitive reasoning, to an audible query received from the user relating to the one or more suggestions or to the one or more journeys via the interactive voice dialog component.

One or more solutions also predict one or more user intention(s) according to a probability of being selected based on a cognitive analysis of data gathered from a plurality of data sources. A machine learning mechanism may use feedback information to learn behavior of the user or vehicle, the plurality of events, and priorities and preferences of the user relating to the one or more journeys, modes of transportation, and the one or more suggestions.

Thus, one or more solutions provide added features and advantages over the current state of the art by gathering historical information from various data sources relating to a user and/or a vehicle used for a journey. Using an interactive voice dialog component, the one or more solutions provide increased safety for a user and/or vehicle by alerting of the risks and, if desired, reasoning about the risks and causes of the risks. One or more suggestions may be provided along with the one or more justifications and reasons supporting the suggestions. The suggestions ensure ongoing reduction and risks associated with a journey.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
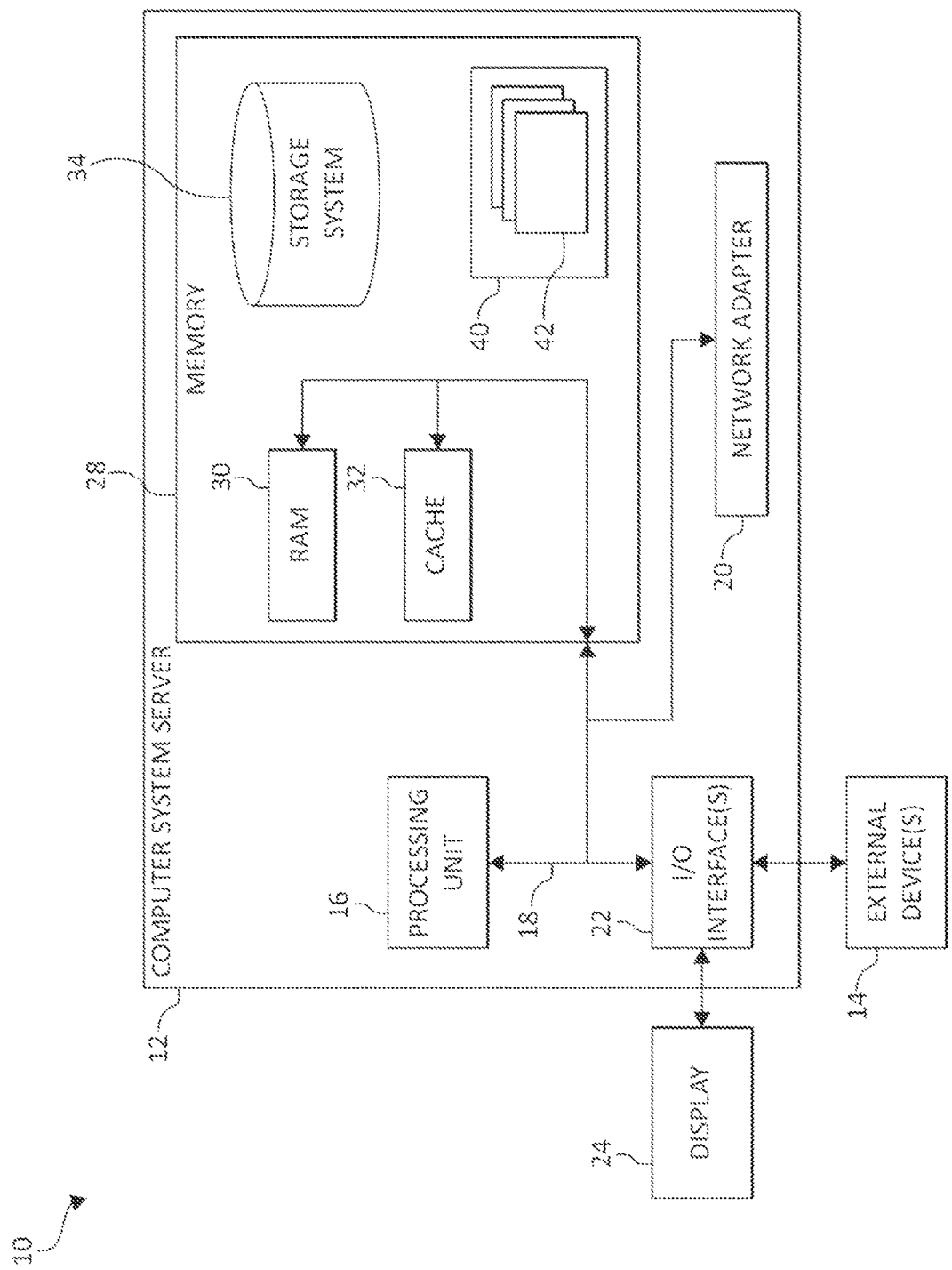
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user. Various IoT appliances may be used for personal use, such as travel or exercise, while also using the IoT appliances within various types of vehicles or navigation systems for travel. For example, an IoT device may be used to inform a user or vehicle of any incidents which may affect travel time/travel safety/travel comfort on a journey and/or be used to assist with travel planning. Such information may be provided to a user during navigation along a route via an in-car navigation device, such as a personal navigation device (PND) or integrated device, or may be provided as an input to an Advanced Driver Assistance System (ADAS).

However, a need exists for providing an interactive, cognitive system that is aware of risks associated with a journey of travel such that the user/vehicle may be informed of the risks while providing one or more suggestions or actions that mitigate the risks associated with a journey.

Thus, the present invention provides a risk-aware cognitive journey companion system having one or more processors. In one embodiment, by way of example only, data gathered from a plurality of data sources relating to one or more journeys may be analyzed. A cognitive reasoning operation may be performed with a user, via an interactive voice dialog component, for providing or selecting one or more suggestions relating to the one or more journeys such that the provided one or more suggestions reduces a risk relating to the one or more journeys, wherein the cognitively reasoning includes one or more audible communications via the interactive voice dialog component with the user.

In an additional aspect, a risk-aware cognitive journey companion system is provided. The risk-aware cognitive journey companion system may analyze data gathered from a plurality of data sources relating to a journey of a user. The risk-aware cognitive journey companion system may also cognitively reason and interact with a user, via a cognitive component, wherein the reasoning and interacting include at least assisting with inferring an intention of the user relating to the journey, providing one or more suggestions relating to a risk of the journey; and selecting the one or more suggestions, and mitigate the risk of the journey by implementing the selected one or more suggestions.

Said differently, the risk-aware cognitive journey companion system may gather data from a plurality of data sources relating to a particular journey of a particular user. The risk-aware cognitive journey companion system may include a cognitive component that may interact and reason with the user, to aid the inference of the intention(s) of the user, to present one or more suggestions relating to the risks involved with the journey, and/or to select one or more of the suggestions. The risk-aware cognitive journey companion system may also include a component to aid the implementation of suggestions mitigating detected risks relating to the one or more journeys. The cognitive component may explain the reasons for its suggestions and interacts using dialogue involving one or more modalities, including the spoken dialogue. The spoken dialogue may comprise one or more audible communications directed at the user or of the user. The component aiding the implementation may control navigation, entertainment, and telecommunication systems in the user's possession and/or associated with the user.

As will be further described, the present invention provides one or more advantages and benefits of a risk-aware cognitive journey companion system by integrating: (i) a large variety of data sources (e.g., traffic data); (ii) cognitive operations to predict user behavior using artificial intelligence (AI); (iii) analysis of the cognitive conditions of the user; (iv) a parsing engine that filters out the risks that are relevant to the user and the current journey; (v) context-aware operations to compute a risk measure associated with a current journey; (vi) a natural language processing (NLP) and interface that interacts and reasons with the user if and only if there is risk detected. For example, in one aspect, the variety of data sources may be analyzed by an NLP operation (e.g., text analysis) to data mine the relevant information from the content of the data sources in order to compute a risk measure associated with a current or predicted journey. The NLP operation may be an instance of an NLP and artificial intelligence (AI) tool such as IBM® Watson® (IBM and Watson are trademarks of International Business Machines Corporation), which may be provided as a cloud service or as a local service.

In one aspect, the present invention provides the risk-aware cognitive journey companion system as a travel companion for users and/or various vehicles, such as an automobile, bicycle, motorcycle, boat, ship, aircraft, off road vehicle, truck, and the like. In this context, the risk-aware cognitive journey companion system provides advanced features and benefits over the current state of the art in that currently available assistance systems focus on particular tasks in a local and short-term context (e.g. lane keeping assist, automatic parking, night vision, brake assistance all address situations and conditions arising in close proximity—temporal and spatial—to the host car), whereas currently available in-car navigation systems mainly provide routing recommendations given traffic state conditions and driver inputs. In contrast, the risk-aware cognitive journey companion system may provide not only routing recommendations given traffic state conditions and user/driver inputs, but also accompanies the user/driver for a global travel/driving task. Furthermore, the present invention monitors the user/driver condition throughout the trip/journey and may reason with the user/driver regarding suggestions being made.

Additional features and advantages of the risk-aware cognitive journey companion system include combining streams of data from various data sources such as, for example, from publicly and commercially available data sources (e.g., weather data, pollution alert data, governmental data sources, social media feeds, crime data/statistics, traffic data sources, traffic/parking regulations), information about the user from one or more IoT devices or sensors (e.g. schedule, signs of cognitive impairment) such as, for example, wearable devices or sensors, and/or from data available on-board a vehicle (e.g. proximity sensors, cameras, radio frequency identification "RFID" readers, biometric sensors, wearable sensors, driving history, charge/fuel state of car, etc.). The stream of data may be processed and the real-time flux of information enables the generation of knowledge or knowledge domain/ontology (e.g., route choice, user fatigue) and enables the prediction of the journey and assessment of risks along the journey, using cloud computing and/or edge computing technology.

Also, as used herein, a vehicle may be an automobile, bicycle, hovercraft, scooter, bus, motorcycle, boat, ship, aircraft, plane, helicopter, drone, off road vehicle, truck, tractor, and/or other device used for movement or transportation. Also, sensors may include proximity sensors, cameras, radio frequency identification "RFID" readers, biometric sensors, wearable sensors, computers, handheld devices (e.g., Global Positioning System "GPS" device or step counters), smart phones, and/or other sensor based devices.

The so-called "journey" may be very subjective and context dependent. A journey may simply be, in a broadest possible meaning, the entire/whole travel experience from a point A to a point B. For example, a journey may encompass an entire travel experience. The journey may start with initiating transport with a first mode of transport and the journey may end with reaching a final destination by a final mode of transport. For example, a journey to work may start by walking to a vehicle (walking being the 1st mode of transport), continue by getting into the vehicle and driving (2nd mode of transport), include all of the decisions made (e.g. which route to take, whether to use the high light beams, what music to listen to, and the like), reaching a parking lot, parking and walking to the office building (walking being a final mode of transport). It would end by reaching the office door.

In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems. In one aspect, a journey may be a user defined location-to-location (point-to-point) journey details or multi-modal travel planning. Also, the journey may be location-to-location (point-to-point) journey details or multi-modal travel planning learned via cognitive reasoning and/or artificial intelligence. Accordingly, the "journey" of a particular user may depend greatly upon contextual factors, such as a user and location-to-location (point-to-point) relationship, and other contextual factors such as defined by a user or learned via artificial intelligence. A deeper, cognitive analysis of the journey may be learned based on, for example, standards, rules, practices, and/or learned journey related behaviors of one or more users in various travel, navigational, telecommunication, entertainment, geographic, and/or travel-risk dimensions. In short, a cognitive learning process using artificial intelligence may learn each of the actions, decisions, modes of travel, and/or behavior patterns of a user to define a "journey". Each learned journey may be saved as part of a user profile and/or retained in a knowledge domain. For example, the cognitive learning may learn preferred modes of travel for a journey (walking and driving to work), preferred entertainment selections related to the journey (e.g., listening to an audio book while commuting to work on a subway/train), and preferred navigational routes on the journey (e.g., traveling by a freeway having increased speed limits as compared to city roads having decreased speed limits), and other various parameters, behaviors, and/or priorities/preferences that may be cognitively learned relating to a journey.

The ontology may include, but not limited to, the knowledge domain or data repository of a collection of material, information, content and/or other resources related to a particular subject or subjects. For example the ontology may include, historical data relating to a user and/or vehicle, a user profile (e.g., calendar information, historical data relating to previous routes/destination data of the user, emotional/physical/mental condition of the user, preferences, priorities, biomedical data, psychophysical parameters of the user, medical history, emotional data, a drivers skills set, and the like), environmental data, traffic data, routes, roads, streets, highways, interstates, trails, bridges, maps, airports, and/or a variety of infrastructures relating to travel each having information relating to both size, length, a degree of complexity or difficulty of travel (e.g., travel navigation complexity), visibility, problems or issues relating to road work or repair, and/or traffic congestion.

For improved computing efficiency and cost savings, the risk-aware cognitive journey companion system may be activated only if a risk is detected. For example, if no (or only negligible) risk is detected during the user's journey, the risk-aware cognitive journey companion system does not interact with the user, but may still perform other actions/background operations as described herein that relate to, for example, detecting a risk. Upon detecting a risk, the risk-aware cognitive journey companion system makes suggestions to mitigate detected risks and is able to reason with the user about such suggestions.

Thus, the present invention provides a risk-aware cognitive journey companion system having one or more processors. One or more solutions are provided for gathering data from a plurality of data sources relating to one or more journeys that may be analyzed. A parsing engine, included within and/or associated with the risk-aware cognitive journey companion system, may parse the data gathered from the plurality of data sources. That is, a natural language processing (NLP) of the risk-aware cognitive journey companion system may interact and reason with the user if and only if there is risk detected. For example, in one aspect, the variety of data sources may be analyzed by an NLP operation (e.g., text analysis) to data mine the relevant information from the content of the data sources in order to compute a risk measure associated with a current journey. Also, the various data sources may include at least a user profile, sensor based devices associated with the user or vehicle, wearable sensors, camera devices, data sources relating to or Internet of Things (IoT) computing networks, governmental entities, commercial entities, or combination thereof.

One or more solutions provide cognitive reasoning with a user, via an interactive voice dialog component, for providing or selecting one or more suggestions relating to the one or more journeys such that the provided one or more suggestions reduce a risk relating to the one or more journeys. For instance, a parking spot may be provided and/or selected to minimize the walking distance in uncovered areas, if a driver of a vehicle has forgotten his/her umbrella. The advantages provided by the embodiments enable cognitively reasoning with a user by the risk-aware cognitive journey companion system interacting with the user using audible communications via the interactive voice dialog component. For example, during the cognitive reasoning, one or more reasons and suggestions may be provided to reduce the risk determined for each of the one or more journeys. Also, instructions for traveling the one or more journeys selected by the user based on the one or more reasons and suggestions may be provided along with justification for supporting the one or more reasons and suggestions for reducing risks associated with the one or more journeys. The risk-aware cognitive journey companion system may respond, during the cognitive reasoning, to an audible query received from the user relating to the one or more suggestions or to the one or more journeys via the interactive voice dialog component.

The risk-aware cognitive journey companion system provides another advantage by providing suggestions to mitigate the various types of risks associated with a journey. Each risk and a cause of the risk associated with the journey may be determined for the one or more journeys. The risks may include various events having a negative impact upon safety, convenience, a duration of travel, level of enjoyment of the user or a vehicle associated with the user, or a combination thereof. The events may include at least historical data relating to a user or vehicle, user behavior, one or more selected priorities of the user, actions of the user, calendar information associated with the user, information provided by one or more sensor devices or tags, biological data, biometric information surveyed from an occupant of a vehicle, physiological data, feedback information, social media information, weather, traffic conditions, environmental conditions, alerts, route conditions, events, accidents, news information, emergency data information, data obtained in real time from sensor based devices associated with the vehicle, detected vehicular faults or failures, devices or components of a vehicle being in an on position or off position, data relating to the vehicle, a plurality of vehicle factors, manufacturing information of the vehicle, a current position of the user or the vehicle, or a combination thereof.

One or more solutions also predict one or more routes, destinations, journeys, or other driving behavior according to a probability of being selected based on a cognitive analysis of data gathered from a plurality of data sources. A machine learning mechanism may use feedback information to learn behavior of the user or vehicle, the plurality of events, and priorities and preferences of the user relating to the one or more journeys, modes of transportation, and the one or more suggestions.

Thus, one or more solutions provide added features and advantages over the current state of the art by gathering historical information from various data sources relating to a user and/or a vehicle used for a journey, and associated environmental conditions, such as, for example, whether a journey is performed or undertaken on a sunny day, a holiday, and/or on a day on which a specific reoccurring event is taking place. Using an interactive voice dialog component, the one or more solutions provide increased safety for a user and/or vehicle by alerting of the risks and, if desired, reasoning about the risks and causes of the risks. One or more suggestions may be provided along with the one or more justifications and reasons supporting the suggestions. The suggestions ensure ongoing reduction and risks associated with a journey.

One or more machine learning models may be invoked and applied to cognitive learning about the user and/or a vehicle such as, for example, user preferences, priorities, behaviors, driving skill set of a user, vehicle capabilities, performance capabilities, and/or other type of data needed for determining a risk.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
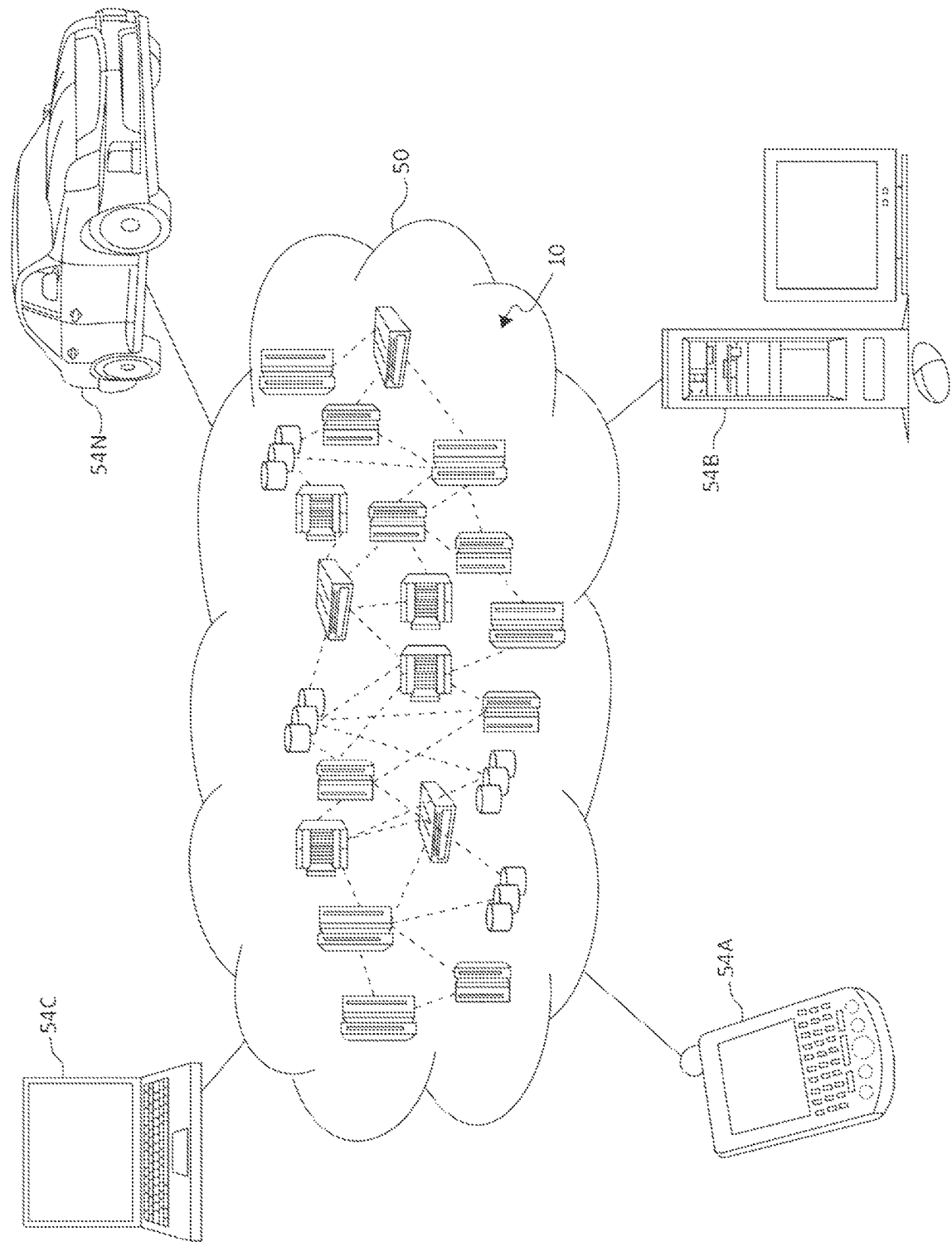
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
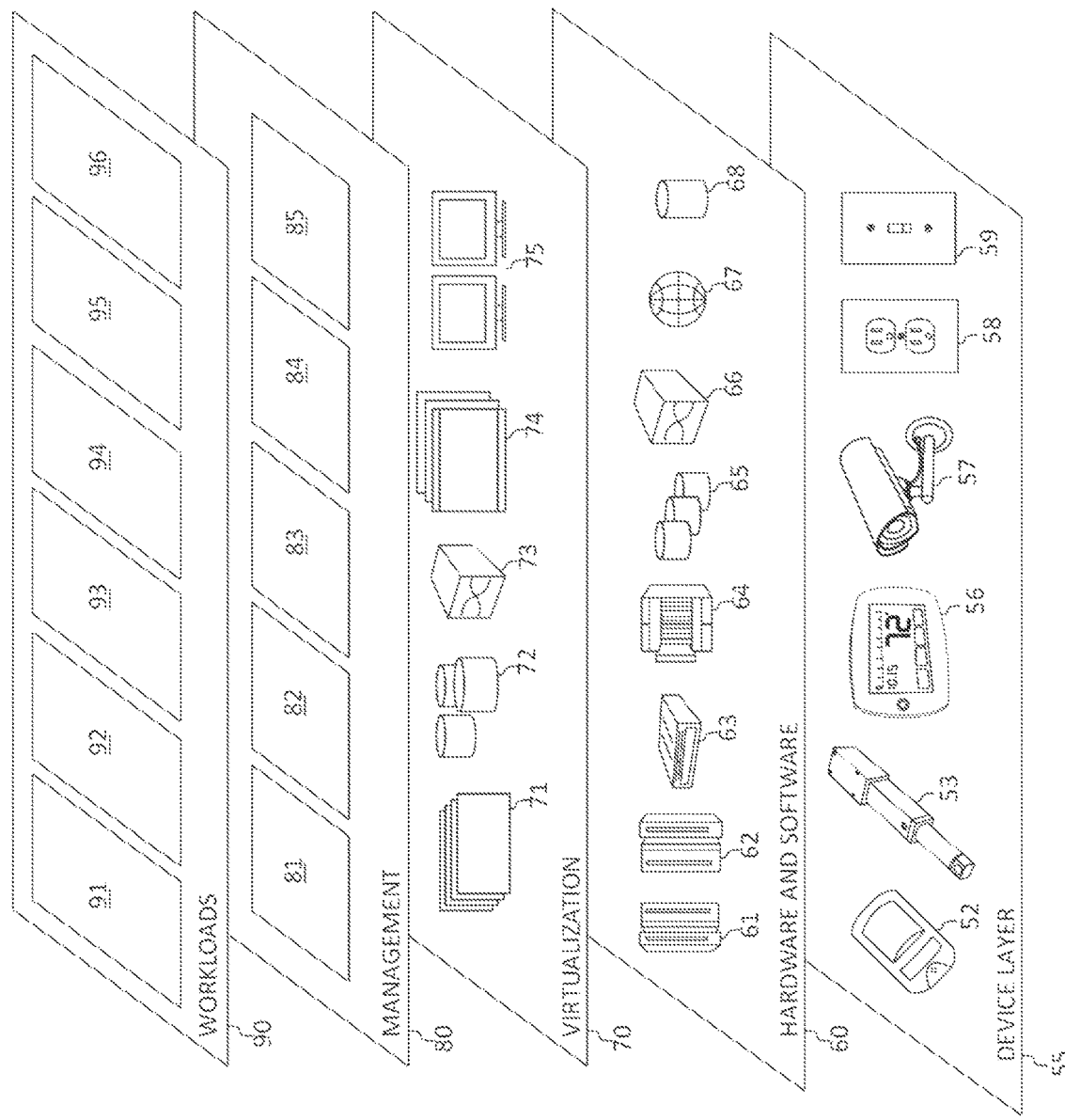
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various cognitive risk mitigation workloads and functions 96. In addition, cognitive risk mitigation workloads and functions 96 may include such operations as data analytics, data analysis, and as will be further described, notification functionality. One of ordinary skill in the art will appreciate that the cognitive risk mitigation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
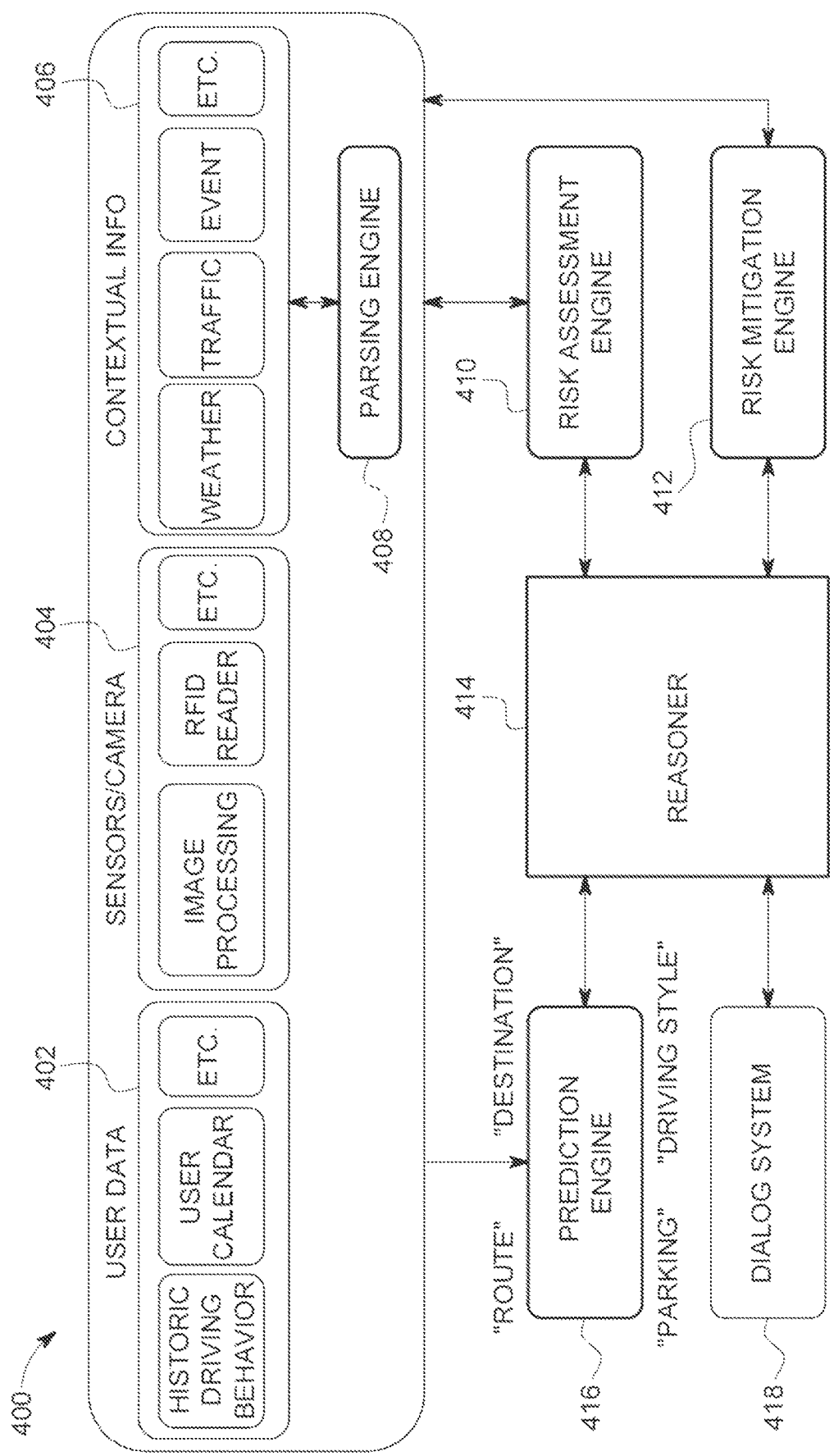
FIG. 4 is an additional block diagram depicting an exemplary functional relationship between various aspects of the present invention.

Turning now to FIG. 4, a block diagram of exemplary functionality 400 of a risk-aware cognitive journey companion system is depicted. It should be noted that the risk-aware cognitive journey companion system may be included in and/or associated with computer system/server 12 of FIG. 1, incorporating one or more processing unit(s) 16 to perform various computational, data processing and other functionality in accordance with various aspects of the present invention. The risk-aware cognitive journey companion system 400 may include a parsing engine 408, a risk assessment engine 410, a risk mitigation engine 412, a reasoner 414 (e.g., an on-board vehicle reasoner), a prediction engine 416 (e.g., "user intention prediction engine" that may include, for example, a route, a destination, parking, and/or driving style), and/or a dialog system 418 (e.g., an interactive graphical user interface "GUI" or interactive voice dialog component).

As one of ordinary skill in the art will appreciate, the depiction of the various functional units in risk-aware cognitive journey companion system 400 is for purposes of illustration, as the functional units may be located within risk-aware cognitive journey companion system 400 or elsewhere within and/or between distributed computing components. Also, the functional blocks 400 and associated notes on specific functionality (as denoted by the darker-lined boxes (e.g., boxes 408, 410, 412, 414, and 416) as compared to the lighter-lined boxes) of the risk-aware cognitive journey companion system 400 may be implemented in hardware and/or software, such as by the computer/server 12 (FIG. 1), and/or the workloads layer 90 (FIG. 3).

As shown, the various blocks of functionality are depicted with arrows designating the blocks' 400 relationships with each other and to show process flow of the risk-aware cognitive journey companion system 400. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for image enhancement in accordance with the present invention. Many of the functional blocks 400 may execute as background processes on various components, either in distributed computing components, or on the user device, or elsewhere, and generally unaware to the user performing generalized tasks of the present invention.

In one aspect, the parsing engine parses data of one or more data sources such as, for example, the user data 402 (e.g., historic driving behavior, calendar of a user, etc. (e.g., other user information)), sensor or camera based devices "sensors/camera" 404 (e.g., image processing sensors or cameras, biometric scanners, and/or RFID reader, etc. (e.g., other sensor, scanner, or camera/media data)), and/or contextual information 406 (e.g., weather, traffic, events, etc. (e.g., other public or available data for use)). The parsing engine 408 may cognitively analyze and learn the relevant data to be parsed from the one or more data sources 402, 404, and/or 406, based on feedback from the risk assessment engine.

The parsing engine 408 may parse contextual information, sensors and user data to identify data that are relevant to the context of a particular journey to enable a risk assessment engine 410 to identify a risk with a high enough associated probability (e.g., a probability above a defined threshold or percentage). In this way, the parsing engine 408 may be coupled to the risk assessment engine 410. The learning part of the parsing engine 408 may occur from direct exchange with the risk assessment engine 410.

In one aspect, the parsing engine 408 may include a natural language processing (NLP) and artificial intelligence (AI) to provide processed content. That is, the parsing engine 408 may receive streams of textual data in natural language from the various data sources such as user data 402, data from publically or commercially available data sources 406, and/or data from one or more microphone based devices 404 local to the user and/or a mode of transportation.

For example, in one aspect, the variety of data sources 402, 404, and 406 may be analyzed by an NLP operation (e.g., text analysis) to data mine the relevant information from the content of the data sources 402, 404, and 406 in order to display or communicate the information in a more usable manner and/or provide the information in a more searchable manner. The parsing engine 408 may be an instance of an NLP and AI tool such as IBM Watson (IBM and Watson are trademarks of International Business Machines Corporation), which may be provided as a cloud service or as a local service. The parsing engine 408 may then provide the risk assessment engine 410 and the driver intention prediction engine 416 the parsed/filtered data.

The prediction engine 416 in association with the reasoner 414 (e.g., user/vehicle intention prediction engine) may predict an intended route, destination, parking spot driving behavior, etc. according to a probability of being selected (e.g., "how likely will the user select a route") based on a cognitive analysis of data gathered from past historical behavior associated with particular contexts (time of the day, traffic state, etc.). The risk assessment engine 410 may assess a risk (or absence of a risk) associated with each journey based on the available information comprising a purpose and destination. In one aspect, the risk may be a combination of events and/or conditions, internal or external to a user/vehicle, that have the potential to negatively impact the safety, convenience, duration, and/or other factors associated with a journey. External conditions may include, for example, weather, traffic and road conditions. The external events may include, for example, an ending of a nearby large concert/sporting event, an accident, and/or a news story. The internal conditions may include, for example, presence or absence of items (identified by RFID tags), user fatigue, vehicle components turned on/off (e.g., headlights, hazard lights, alarm systems, global positioning system "GPS", etc.). The internal events may include, for example, a user action, a fault detected in the vehicle. The risk assessment engine 410 in association with the parsing engine 408 may parse the available data to: 1) define one or more risks, and/or 2) assess whether risks are present on a journey.

The risk mitigation engine 412 in association with the reasoner 414 may provide one or more suggestions so as to avoid and/or mitigate one or more risks along a user's journey. That is, the risk mitigation engine 412 may compute possible actions to mitigate each risk. The risk mitigation engine 412 in association with the reasoner 414 may also provide justifications and reasons for such suggestions.

The reasoner 414 may then generate a dialog with a user via the dialog system thereby reasoning with the user about risks and suggestions. The reasoner 414, using one or more components described above, may provide/generate the one or more suggestions for the risks. The reasoner 414 may also assess whether the combined risk level assigned to the risk and the probability of the risk being present on the journey justify or require user interaction. If a risk is detected, the reasoner 414 may generate voice output using the dialog system 418 while also detecting a query or response from the user.

For example, the reasoning may include employing an artificial intelligence system to "reason" with the user. The reasoning may include justifying (e.g., providing support/evidence in a language format such as, for example, audible or written communication) untestable to the user/vehicle for each suggestion. There may be several levels of reasons. For example, the reasoner 414 may provide an audible command that states "I suggest you turn up the music" to which a user may reply back to the reasoner 414 with a communication message stating "Why?". The reasoner 414 may then provide a second level of reasoning with a communication message stating "You seem fatigued" (high-level reason). The user may reply back to the reasoner 414 with a communication message stating "Oh, why would you think that?". The reasoner 414 may then provide a third level of reasoning, having a justification included therein, with a communication message stating "Your blinking has slowed considerably" (lower-level reason). The user may reply back to the reasoner 414 with a communication message stating "No, I'm fine (I just got something in my eye)".

The reasoner 414 may be able to use machine learning to learn behavior, preferences, user/vehicle conditions, or other information, and/or update the ontology or knowledge domain by incorporating into its risk assessment a reaction of a user to the various explanations provided. Said differently, the reasoner 414 may use the dialogue as feedback for machine learning and/or as another source of information, e.g. the reasoner 414 reasons/justification of "you seem fatigued" and the user response of "No, I'm fine (I just got something in my eye)". The reasoner 414 may update its estimate of the user cognitive state from fatigued to normal. As another illustration, the reasoner 414 reasons/justification of "I suggest destination X" and the user response of "I don't like to park there", the reasoner 414 may update the user preferences/risk mitigation priorities to reflect this user preference. It should be noted that the reasoner 414, as mentioned above, may initialize the machine learning mechanism using feedback information to learn behavior of the user or vehicle, the plurality of events, and priorities and preferences of the user relating to the one or more journeys, modes of transportation, and the one or more suggestions.

Consider the following example of an implementation of the aforementioned functionality where the risk-aware cognitive journey companion system is included within a vehicle. That is, the example illustrates use of the risk-aware cognitive journey companion system using onboard data (sunglasses/umbrella not present), externally available data (weather/crime) and has a learning component (knows the driver's usual routes/driving volume).

In the example, the risk-aware cognitive journey companion system may communicate with an in-vehicle sensor/camera to detect that a driver is not wearing any sunglasses (a determined risk), while also determining from one or more data streams that the most probable route is also exposed to the setting sun at the particular time of the day. An RFID reader associated with the risk-aware cognitive journey companion system may also add the information that the sunglasses are not even in the vehicle (an additional detected risk). The risk-aware cognitive journey companion system may then suggest to the user to take a less sunlight exposed route. The risk-aware cognitive journey companion system may allow the in-vehicle sensors/cameras to detect that the driver did not bring his/her umbrella upon determining from the data sources that it is raining (a determined risk) at the predicted destination. The risk-aware cognitive journey companion system may suggest a covered parking structure (i.e., a mitigating action associated with the risk of rain) with a farther, yet covered, walk to the final destination. The risk-aware cognitive journey companion system may detect signs of cognitive impairment (e.g., stress, tiredness, low eyesight) and hence an alternative route with less sources of danger may be proposed (e.g., no presence of schools, less traffic, better illumination).

As another illustration of the continued example, based on recent crime alerts, the risk-aware cognitive journey companion system may suggest a different route or suggest keeping the doors locked thereby mitigating the risk inherent to a particularly unsafe neighborhood. The risk-aware cognitive journey companion system may predict that the fuel is going to run low in 2 days and suggests the user take a detour to a usual gas station given that the risk-aware cognitive journey companion system has determined the user has enough time to reach the predicted destination, even with the suggested detour. The risk-aware cognitive journey companion system may detect that some headlights are off in spite of the road type or the poor illumination and therefore suggests to the driver to turn on the headlights.

Figure 5:
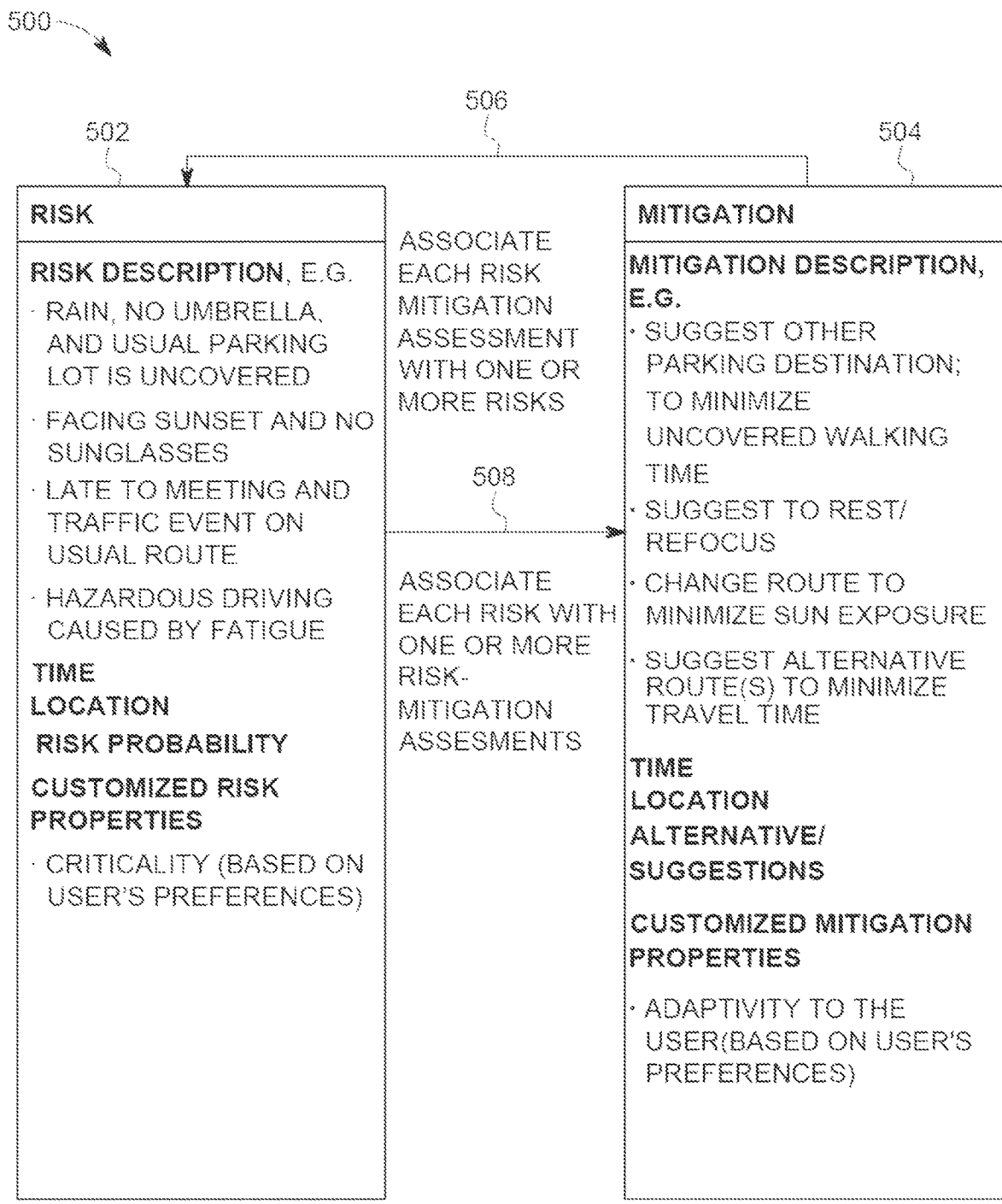
FIG. 5 is an additional block diagram depicting an exemplary risk model for risk mitigation and risk assessment in accordance with aspects of the present invention.

Turning now to FIG. 5, a block diagram of exemplary functionality 500 of a risk model of a risk-aware cognitive journey companion system is depicted. It should be noted that the risk model may be included in and/or associated with computer system/server 12 of FIG. 1, incorporating one or more processing unit(s) 16 to perform various computational, data processing and other functionality in accordance with various aspects of the present invention. The components, modules, and/or functions described in FIG. 5 may include a browser, a proxy, a registry, and a server.

Consider the following example of an implementation of the functionality of FIG. 5. A risk assessment component 502 "Risk" may determine a risk and a cause of the risk for one journey. The risk assessment component 502 may define the risk for the one or more journeys based on a cognitive analysis of data gathered from the plurality of data sources, and/or determine a presence or absence of the risk for the journey. Also, each risk may be associated with one or more risk-mitigating assessments, as shown in action step 508.

For example, the determined risks in relation to the journey may include, for example, rain occurring on the one or more journeys, a parking lot is uncovered (thus being exposed to excessive sunlight or rain), a user/vehicle will be facing a sunset and the user does not have sunglasses or the vehicle is absent any tinted windows or shading, the user/vehicle is late to a scheduled meeting, traffic is extremely heavy, one or more accidents on the one or more journeys, fatigue is detected on the user, and hazardous driving caused by the fatigue. The risks may also include vehicle problems (e.g., engine break down, exhaustion issues, transmission problems, radiator problems, and the like), historical problems experienced by the user/vehicle on the one or more journeys. In short, the risks may include information and risks relating to time, location, risk probability, and/or customized risk properties such as the risk's severity, impact of the associated mitigating actions, criticality (e.g., criticality for the risk can measure the sensibility of the user to that risk). For example, a driver may disfavor windy roads, may prefer motorway traffic over normal traffic, may desire to always minimize travel time, may value fuel consumption, and/or other preferences or priorities, which can be learned via a dialog system. Using a machine learning model, the machine learning model may learn various risks based on the user/vehicle behavior such as, for example, the criticality of risks based on user's preferences. It should be noted that the one or more mitigating actions described herein are provided for illustration purposes only and are not to be interpreted as an exhaustive list. Accordingly, the one or more mitigating actions may include a variety of mitigating suggestions learned by machine learning, predefined, and/or cognitively learned based upon identified risks.

A risk mitigation component 504 "Mitigation" may determine one or more mitigating actions (e.g., suggestions) so as to mitigate or reduce the risk, and also determine those of the mitigating actions that have less risk as compared to other mitigation actions. Also, each of the risk mitigation assessments may be associated with one or more risks, as shown in action step 506.

For example, the one or more mitigating actions associated with one or more risks may include suggesting one or more alternative parking destinations to minimize walking in uncovered walking areas and walking time, and suggesting to the user to take a rest and/or refocus so as to increase user productivity or attention. The one or more mitigating actions may also include, for example, suggestion to the user to change routes to minimize exposure to sunlight. The one or more mitigating actions may include suggesting alternative routes to minimize travel time. In short, the one or more mitigating actions may include information and suggestions relating to time, location, alternative suggestions, and/or customized mitigation properties. Using machine learning algorithms, the machine learning model may learn user/vehicle behavior and adapt the one or more mitigating actions to the learned behavior or propensities such as, for example, adapting the one or more mitigating actions based on user preferences. It should be noted that the one or more mitigating actions described herein are provided for illustration purposes only and are not to be interpreted as an exhaustive list. Accordingly, the one or more mitigating actions may include a variety of mitigating suggestions learned by machine learning, predefined, and/or cognitively learned based upon identified risks.

Figure 6:
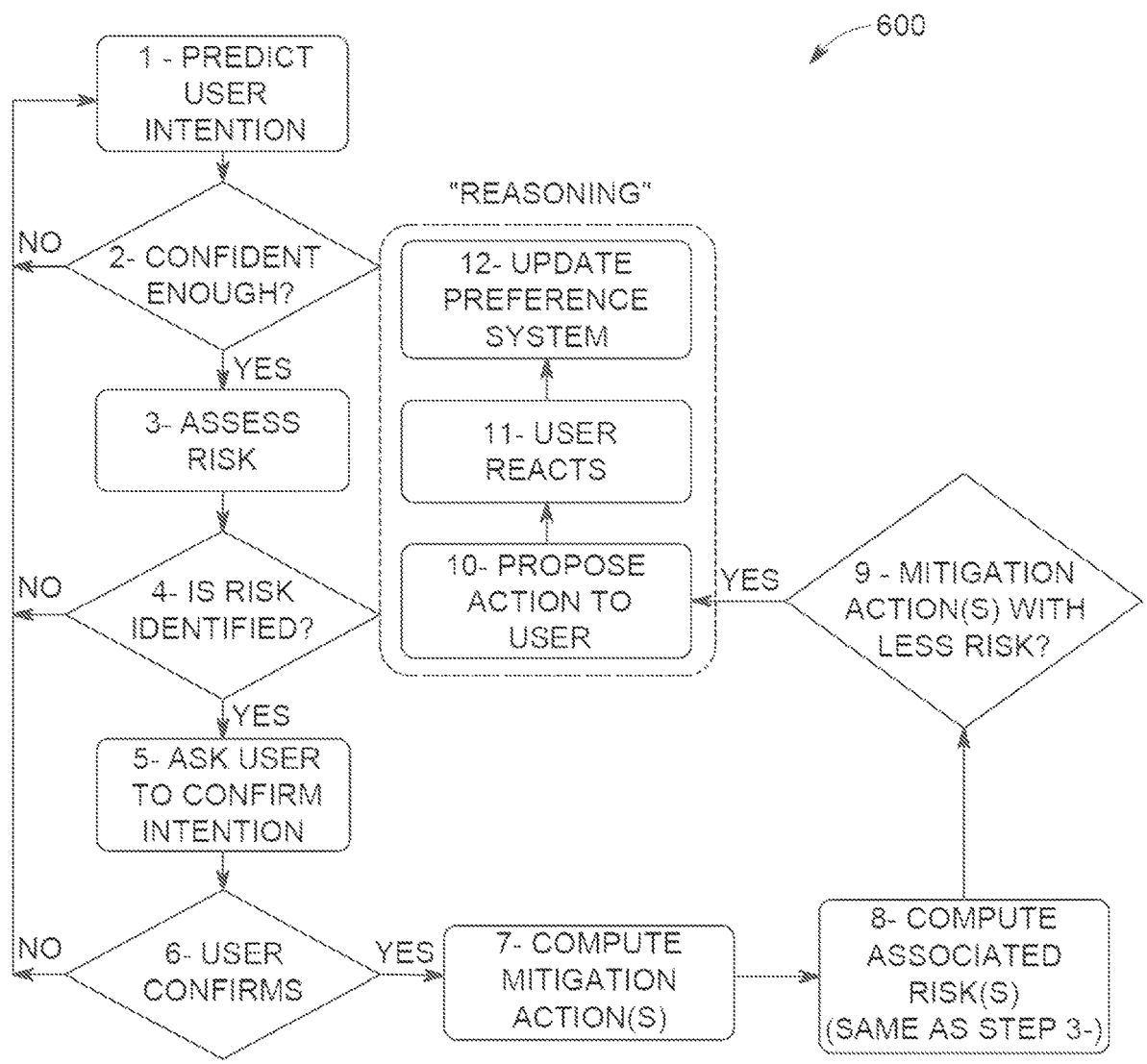
FIG. 6 is an additional flowchart diagram depicting an additional exemplary method for cognitive risk mitigation for a journey by a processor, again in which aspects of the present invention may be realized.

Turning now to FIG. 6, a method 600 for cognitive risk mitigation for a journey by a processor is depicted, in which various aspects of the illustrated embodiments may be implemented. In one aspect, each of the components, modules, and/or functions described in FIGS. 1-5 may also apply to the components, modules, and functions of FIG. 6. The functionality 600 may be implemented as a method executed as instructions on a machine, where the instructions are included on at least one computer readable medium or one non-transitory machine-readable storage medium. The functionality 600 may start by predicting an intention of the user (e.g., predict the user may continue traveling along a current route based on trajectory), as in step 1. In step 2, a determination operation may be performed to determine a confidence/accuracy level of the predicted intention of the user. If no at step 2, the prediction keeps going, as in step 1. If yes at step 2, a risk associated with the journey may be assessed, as in step 3. In step 4, a determination operation may be performed to determine if a risk associated with the journey is identified (e.g., present or absent). If no at step 4, there is no identified risk and the system continues to predict risk, as in step 1. If yes at step 4, a query is issued to the user to confirm the user's intention, as in step 5. The user may confirm the intention, as in step 6. If no at step 6, the prediction may keep going, as in step 1. If yes at step 6, one or more mitigation actions (e.g., suggestions) may be determined so as to mitigate or reduce the risk, as in step 7. In step 8, the risk of the proposed mitigation actions may be assessed (e.g., computed and/or determined), as in step 3. In step 9, it is verified whether the evaluated mitigation action(s) have less risk than the initial action without system intervention. If yes at step 9, the functionality 600 may move to step 10.

At this point, the functionality 600 may enter a "reasoning" phase, where in step 10, one or more suggestions/actions may be proposed to the user. In step 11, the user may respond and/or react to the one or more suggestions/actions (e.g., responds to a reasoner 414 via a dialog system and states "Why should I take this alternative route?"). In step 12, the user's preferences may be updated.

Consider the following use case of an implementation of the aforementioned functionality where the risk-aware cognitive journey companion system is included within a vehicle. Assume Alice leaves her house on a Tuesday at 8 am. The risk-aware cognitive journey companion system may detect that she left home and is driving a vehicle. The risk-aware cognitive journey companion system may begin to predict the destination and the most likely route (e.g., one or more predicted routes based on a probability of being selected), using predictors such as the time of day, the day of the week, and prior journeys undertaken by Alice. The risk-aware cognitive journey companion system may compute/determine a percentage of likelihood (e.g., a percentage of 50% or more) of Alice driving to college and taking a route along Main Street. The risk-aware cognitive journey companion system may filter the data streams, such as weather, social media, traffic, and/or other streamed data. The risk-aware cognitive journey companion system may detect signs of cognitive impairment (fatigue, stress, negative emotional state such as yawning, yelling, screaming, and the like that represent a risk). The risk-aware cognitive journey companion system may run/perform an optimization operation to find one or more best/optimal alternative routes to the predicted destinations (e.g., no risks such as, for example, no schools, less traffic, increased illumination along the route, fewer turns, and the like). The risk-aware cognitive journey companion system may ask Alice to confirm that she is planning to go to college via Main Street. Upon confirmation, the risk-aware cognitive journey companion system may suggest the identified best alternative route to the confirmed destination. If Alice inquires or queries the risk-aware cognitive journey companion system why the suggestion was made, the risk-aware cognitive journey companion system may inform (via a variety of methods such as audible communication, media feeds, text, emails, and the like) her that she seems tired and the suggested route requires fewer turns. If Alice inquires or queries the risk-aware cognitive journey companion system why she seems tired, the risk-aware cognitive journey companion system may inform Alice that she is squinting. Alice may then respond (e.g., via an audible command back to the system) that she is not tired, but merely forgot her contact lenses. The risk-aware cognitive journey companion system may update its assessment of Alice's cognitive state. Alice may then ignore and not follow the suggestion and continue on her present/current route.

Consider the following use case of an implementation of the aforementioned functionality where the risk-aware cognitive journey companion system is used for a pedestrian. Again, Alice leaves her house on a Tuesday at 8 am. The risk-aware cognitive journey companion system may detect that Alice left home and is travelling by foot. The risk-aware cognitive journey companion system may begin to predict the destination and the most likely route there, using predictors such as the time of day, the day of the week, and prior journeys undertaken by Alice. The risk-aware cognitive journey companion system may compute/determine a probability (e.g., a high likelihood greater than 50%) of Alice walking to college, taking a route along Main Street. The risk-aware cognitive journey companion system may compute/determine if there is a lesser probability (e.g., a likelihood less than 50%) of Alice walking through the Park, and her destination being the Library. The risk-aware cognitive journey companion system may filter the data streams, such as weather, social media, but also Alice's heart rate, walking pace, and/or other emotional or physiological data with respect to the most likely destinations while also looking for and/or determining risks. The risk-aware cognitive journey companion system may not confirm the destination with Alice since there are no current risks detected along the route. After a few minutes, the risk-aware cognitive journey companion system may read, receive, and/or detect several social media feeds (e.g., "tweets") about a large gathering of people (e.g., a "demonstration" of people), taking place on Main Street. The risk-aware cognitive journey companion system may classify the gathering of a large group of people (e.g., the demonstration) as a risk since the demonstration may cause congestion (e.g., traffic congestions), which may negatively impact (e.g., hinder) Alice's progress and/or present a safety hazard to pedestrians. The risk-aware cognitive journey companion system may ask Alice to confirm that she is planning to go to college via Main Street. Upon confirmation, the risk-aware cognitive journey companion system may suggest Alice walk through the Park today. If Alice inquires why the suggestion was made, the risk-aware cognitive journey companion system may inform her of the demonstration such as, for example, by providing to Alice an audible communication and/or a live broadcast feed via an interactive GUI or wireless communication device (e.g., computer, tablet, smart phone, etc.).

Consider the following use case of an implementation of the aforementioned functionality where the risk-aware cognitive journey companion system is used for a bicycle. Alice leaves her house on a Tuesday at 8 am. The risk-aware cognitive journey companion system may detect that Alice left home and is travelling by bike. The risk-aware cognitive journey companion system may begin to predict the destination and the most likely route there, using predictors such as the time of day, the day of the week, and prior journeys undertaken by Alice. The risk-aware cognitive journey companion system may compute/determine a high likelihood (e.g., a probability or percentage greater than 50%) of Alice taking her bicycle to college and taking a route along Main Street. The risk-aware cognitive journey companion system may compute/determine there is a smaller likelihood (e.g., a probability or percentage less than 50%) of Alice cycling through the Park and her destination being the Library. The risk-aware cognitive journey companion system may filter the data streams, such as weather, social media, but also Alice's heart rate, biking pace, and/or other emotional or physiological data with respect to the most likely destinations while also looking for and/or determining risks. The risk-aware cognitive journey companion system may determine the air quality indices are showing high levels (greater than a defined or selected level) of pollution along Main Street. The risk-aware cognitive journey companion system may ask Alice to confirm that she is planning to go to college via Main Street. Upon confirmation, the risk-aware cognitive journey companion system may suggest Alice cycle through the Park today. If Alice inquires or responds to the risk-aware cognitive journey companion system (e.g., via a reasoner) why the suggestion was made, the risk-aware cognitive journey companion system may inform Alice that the air quality on the street is low and there is no indication of current pollution in the Park such as, for example, by providing to Alice an audible communication and/or a live broadcast feed via an interactive GUI or wireless communication device (e.g., computer, tablet, smart phone, etc.).

Figure 7:
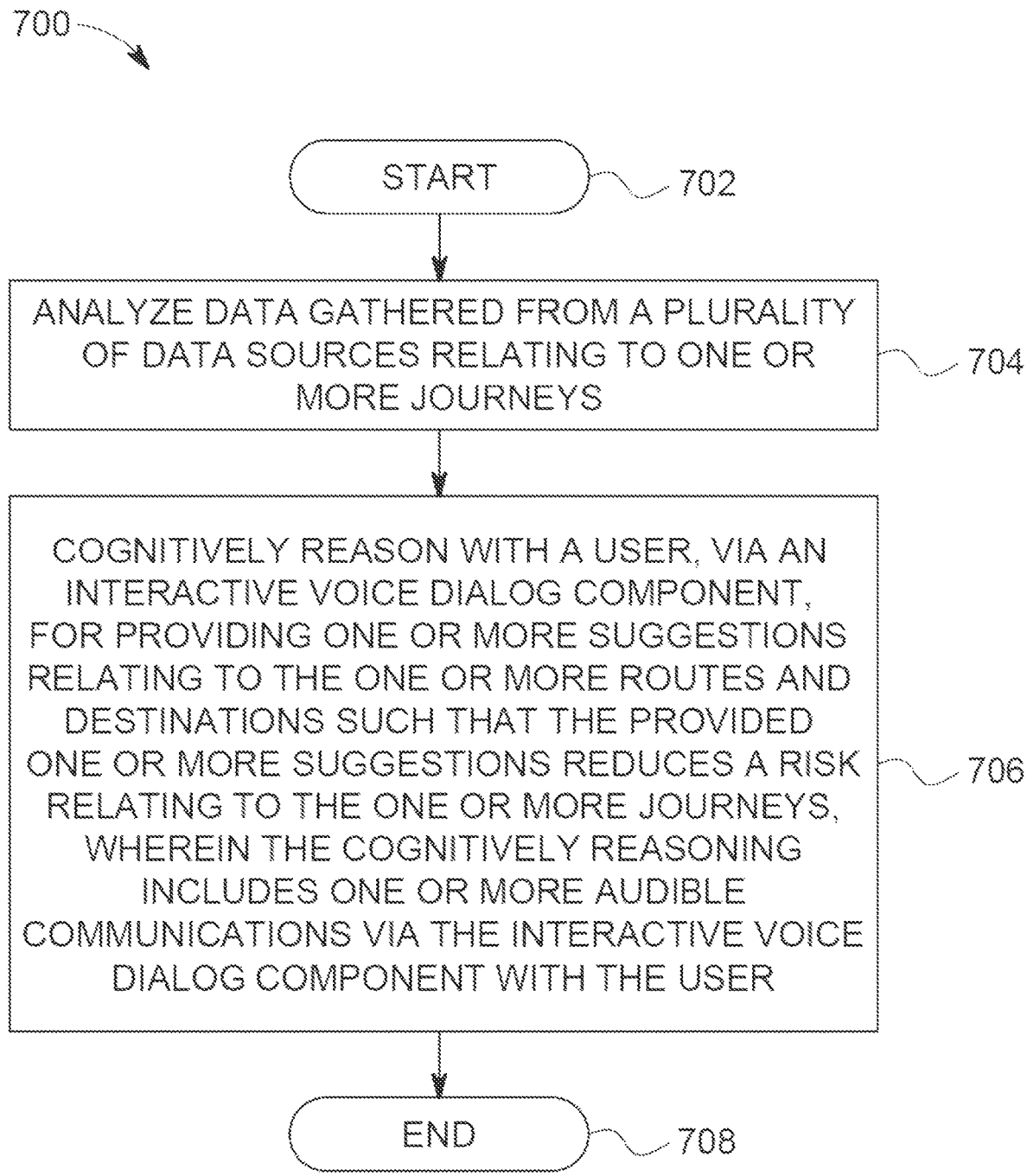
FIG. 7 is an additional flowchart diagram depicting an additional exemplary method for cognitive risk mitigation for a journey by a processor, again in which aspects of the present invention may be realized.

Turning now to FIG. 7, a method 700 for cognitive risk mitigation for a journey by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. Data gathered from a plurality of data sources relating to a journey (e.g., a particular, selected, and/or defined journey) may be analyzed, as in block 704. A cognitive reasoning operation may be performed with a user, via an interactive voice dialog component, for providing or selecting one or more suggestions relating to the journey such that the provided one or more suggestions reduces a risk relating to the journey, wherein the cognitively reasoning includes one or more audible communications via the interactive voice dialog component with the user, as in block 706. The cognitive reasoning operation might use the experience gained from past dialogs. The functionality 700 may end, as in block 708.

Figure 8:
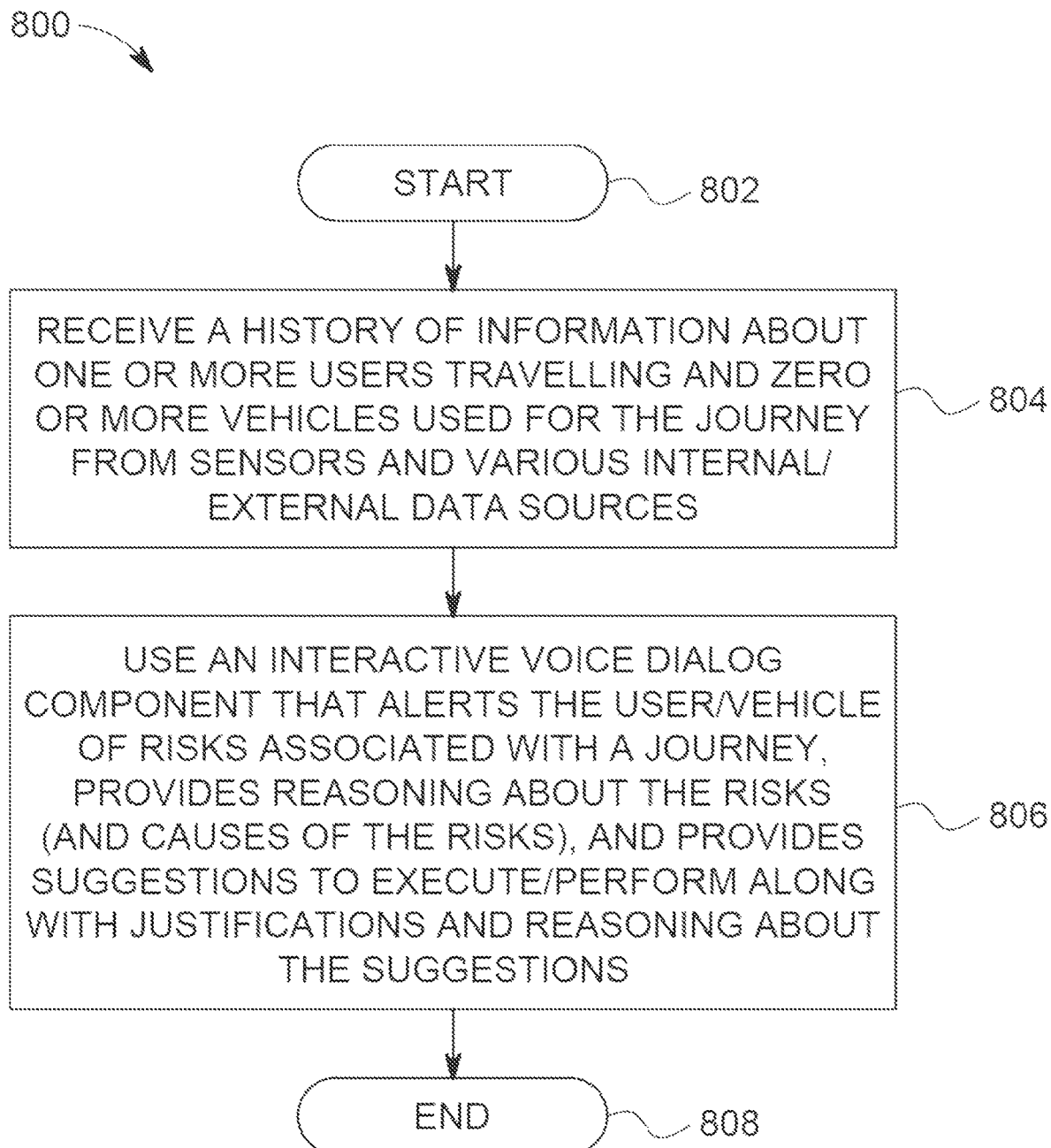
FIG. 8 is an additional flowchart diagram depicting an additional exemplary method for cognitive risk mitigation for a journey by a processor, again in which aspects of the present invention may be realized.

Turning now to FIG. 8, a method 800 for cognitive risk mitigation for a journey by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. A history of information may be received about one or more users travelling and zero or more vehicles used for the journey from sensors and various internal/external data sources, as in block 804. An interactive voice dialog component may be used that alerts the user/vehicle of risks associated with a journey, provides reasoning about the risks (and causes of the risks), and provides suggestions to execute/perform along with justifications and reasoning about the suggestions, as in block 806, which may also lead to an update of one or more preferences (see FIG. 6). The functionality 800 may end, as in block 808.

In one aspect, in conjunction with and/or as part of at least one block of FIGS. 7 and 8, the operations of methods 700 and 800 may include each of the following. The operations of methods 700 and 800 determine the risk and a cause of the risk for the journey. The risks may include a plurality of events having a negative impact upon safety, convenience, a duration of travel, level of enjoyment of the user or a vehicle associated with the user, or a combination thereof. The plurality of events may include at least historical data relating to a user or vehicle, user behavior, one or more selected priorities of the user, actions of the user, calendar information associated with the user, information provided by one or more sensor devices or tags, biological data, biometric information surveyed from an occupant of a vehicle, physiological data, feedback information, social media information, weather, traffic conditions, environmental conditions, alerts, route conditions, events, accidents, news information, emergency data information, data obtained in real time from sensor based devices associated with the vehicle, detected vehicular faults or failures, devices or components of a vehicle being in an on position or off position, data relating to the vehicle, a plurality of vehicle factors, manufacturing information of the vehicle, a current position of the user or the vehicle, or a combination thereof.

The operations of methods 700 and 800 define the risk for the one or more journeys based on a cognitive analysis of data gathered from the plurality of data sources, determine a presence or absence of the risk for the journey; and/or determine the one or more suggestions according to the analyzed data to reduce the risk determined for the journey. The data gathered from the plurality of data sources may be parsed and filtered. The plurality of data sources may include at least a user profile, sensor based devices associated with the user or vehicle, wearable sensors, camera devices, data sources relating to or Internet of Things (IoT) computing networks, governmental entities, commercial entities, or combination thereof.

The operations of methods 700 and 800 may provide, during the cognitive reasoning, the one or more reasons and suggestions to reduce the risk determined for each of the one or more journeys, provide, during the cognitive reasoning, instructions for traveling the one or more journeys selected by the user based on the one or more reasons and suggestions, and/or provide, during the cognitive reasoning, justification for supporting the one or more reasons and suggestions for reducing risks associated with the one or more journeys. The one or more audible communications may include responding, during the cognitive reasoning, to an audible query received from the user relating to the one or more suggestions or to the one or more journeys via the interactive voice dialog component. The intention of a driver along a journey may be predicted according to a probability of being selected based on a cognitive analysis of data gathered from a plurality of data sources. Also, a machine learning mechanism using feedback information may be used to learn behavior of the user or vehicle, the plurality of events, and priorities and preferences of the user relating to the one or more journeys, modes of transportation, and the one or more suggestions.

Figure 9:
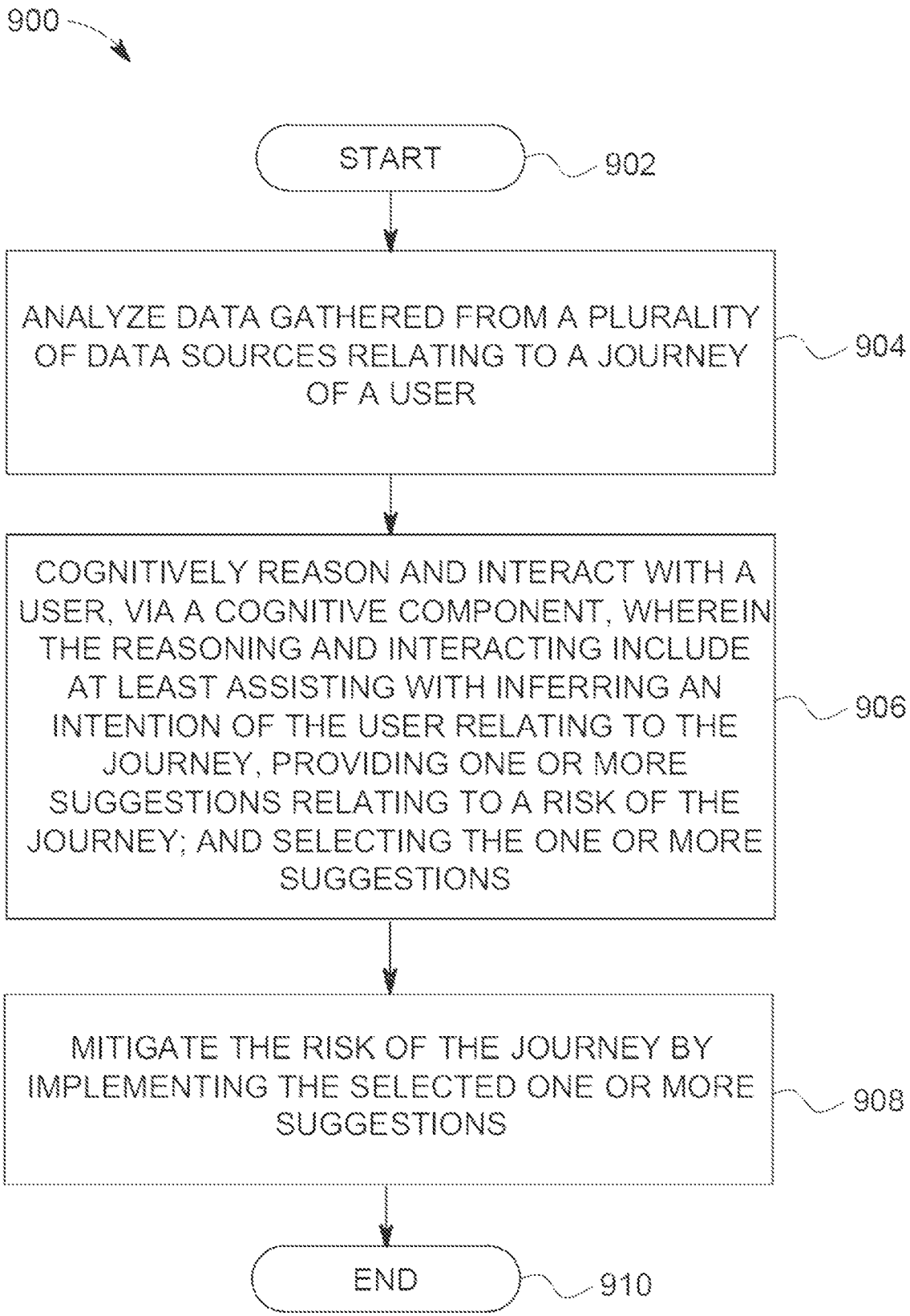
FIG. 9 is an additional flowchart diagram depicting an additional exemplary method for cognitive risk mitigation for a journey by a processor, again in which aspects of the present invention may be realized.

Turning now to FIG. 9, a method 900 for cognitive risk mitigation for a journey by a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902. Data gathered from a plurality of data sources relating to a journey of a user may be analyzed, as in block 904. A cognitive component may be used to cognitively reason and interact with a user, wherein the reasoning and interacting include at least assisting with inferring an intention of the user relating to the journey, providing one or more suggestions relating to a risk of the journey; and selecting the one or more suggestions, as in block 906. The risk of the journey may be mitigated by implementing the selected one or more suggestions, as in block 908. The functionality 900 may end, as in block 910.

In one aspect, in conjunction with and/or as part of at least one block of FIG. 9, the operations of method 900 may include each of the following. The operations of method 900 may send to the user or receive from the user one or more audible communications via an interactive voice dialog component such as, for example, while cognitively reasoning and interacting with the user. The operations of method 900 may respond to an audible query received from the user relating to the one or more suggestions or to the predicted intention of the user via the interactive voice dialog component such as, for example, while cognitively reasoning and interacting with the user. The operations of method 900 may control a navigation system associated with the user, an entertainment system associated with the user, and/or a telecommunication system associated with the user, or a combination thereof such as, for example, while implementing the selected one or more suggestions. It should be noted that the inferring an intention may or may not be performed as part of the cognitive reasoning and interaction with the user. For example, the cognitive component may give suggestions also without inferring an intention first (e.g., such as when a driver forgets their glasses, the cognitive component may suggest to the driver to go retrieve the glasses without even knowing where the driver wants to go).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A system for cognitive monitoring of a journey, comprising:
one or more computers with executable instructions that when executed cause the system to:
analyze data gathered from a plurality of data sources relating to a journey of a user by parsing and filtering the data gathered from the plurality of data sources, wherein the plurality of data sources include at least data sources relating to Internet of Things (IoT) computing networks, governmental entities, and commercial entities;
cognitively reason and interact with a user, via a cognitive component, wherein the reasoning and interacting include at least predicting an intention of the user relating to the journey according to a probability of the intention being selected based on a cognitive analysis of the data gathered from the plurality of data sources, and providing one or more suggestions relating to a risk of the journey according to the cognitive analysis; and
mitigate the risk of the journey by implementing the one or more suggestions.

2. The system of claim 1, wherein the cognitive analysis further includes providing one or more explanations relating to reasons for providing the one or more suggestions.

3. The system of claim 1, wherein the cognitive analysis further includes inferring the intention of the user relating to the journey.

4. The system of claim 1, wherein the cognitive analysis further includes sending one or more audible communications via an interactive voice dialog component.

5. The system of claim 4, wherein the one or more audible communications further includes responding to an audible query received from the user relating to the one or more suggestions.

6. The system of claim 1, wherein the executable instructions further implement the one or more suggestions by controlling a navigation system, an entertainment system, or a telecommunication system, or a combination thereof associated with the user.

7. The system of claim 1, wherein the plurality of data sources further include at least a user profile, sensor based devices associated with the user or vehicle, wearable sensors, camera devices, or combination thereof.

8. The system of claim 1, wherein the executable instructions further:
determine the risk and a cause of the risk for the predicted intention of the user in relation to the journey; and
determine the one or more suggestions according to the analyzed data to reduce the risk determined for the predicted intention of the user in relation to the journey or an alternative journey.

9. The system of claim 1, wherein the executable instructions further provide instructions for traveling the journey or an alternative journey based on the one or more suggestions.

10. The system of claim 1, wherein the executable instructions further initialize a machine learning mechanism using feedback information to learn behavior of the user, a vehicle, a plurality of events of the user or the vehicle, and priorities and preferences of the user relating to the journey, modes of transportation, and the one or more suggestions.

11. A computer program product for monitoring of a journey, by a processor, the computer program product comprising a non-transitory computer-readable storage medium having computer-readable program code portions stored therein, the computer-readable program code portions comprising:
an executable portion that analyzes data gathered from a plurality of data sources relating to a journey of a user by parsing and filtering the data gathered from the plurality of data sources, wherein the plurality of data sources include at least data sources relating to Internet of Things (IoT) computing networks, governmental entities, and commercial entities;
an executable portion that cognitively reasons and interacts with a user, via a cognitive component, wherein the reasoning and interacting include at least predicting an intention of the user relating to the journey according to a probability of the intention being selected based on a cognitive analysis of the data gathered from the plurality of data sources, and providing one or more suggestions relating to a risk of the journey according to the cognitive analysis; and
an executable portion that mitigates the risk of the journey by implementing the one or more suggestions.

12. The computer program product of claim 11, wherein the cognitive analysis further includes providing one or more explanations relating to reasons for providing the one or more suggestions.

13. The computer program product of claim 11, wherein the cognitive analysis further includes inferring the intention of the user relating to the journey.

14. The computer program product of claim 11, wherein the cognitive analysis further includes sending one or more audible communications via an interactive voice dialog component.

15. The computer program product of claim 14, wherein the one or more audible communications further includes responding to an audible query received from the user relating to the one or more suggestions.

16. The computer program product of claim 11, further including an executable portion that implements the one or more suggestions by controlling a navigation system, an entertainment system, or a telecommunication system, or a combination thereof associated with the user.

17. The computer program product of claim 11, wherein the plurality of data sources further include at least a user profile, sensor based devices associated with the user or vehicle, wearable sensors, camera devices, or combination thereof.

18. The computer program product of claim 11, further including an executable portion that:
determines the risk and a cause of the risk for the predicted intention of the user in relation to the journey; and
determines the one or more suggestions according to the analyzed data to reduce the risk determined for the predicted intention of the user in relation to the journey or an alternative journey.

19. The computer program product of claim 11, further including an executable portion that provides instructions for traveling the journey or an alternative journey based on the one or more suggestions.

20. The computer program product of claim 11, further including an executable portion that initializes a machine learning mechanism using feedback information to learn behavior of the user, a vehicle, a plurality of events of the user or the vehicle, and priorities and preferences of the user relating to the journey, modes of transportation, and the one or more suggestions.

* * * * *